Jan. 28, 1958     W. N. ALEXANDER     2,821,534
LIQUID PHASE OXIDATION OF ORGANIC COMPOUNDS
Filed Sept. 16, 1954     5 Sheets-Sheet 1
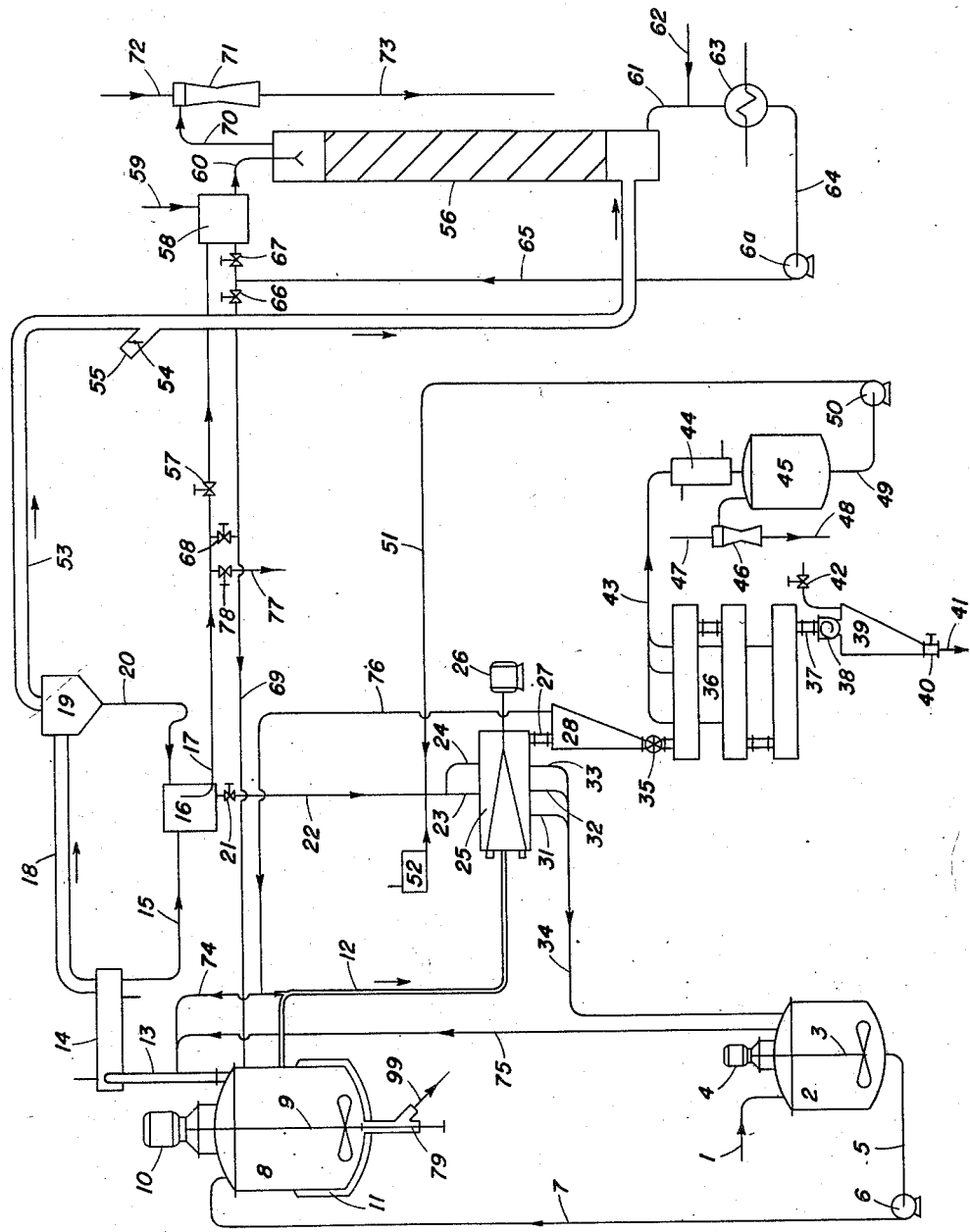
Fig. I.
Walter N. Alexander
INVENTOR
BY
ATTORNEYS Jan. 28, 1958 W. N. ALEXANDER 2,821,534
LIQUID PHASE OXIDATION OF ORGANIC COMPOUNDS
Filed Sept. 16, 1954 5 Sheets-Sheet 2

Walter N. Alexander
INVENTOR
BY
ATTORNEYS

Jan. 28, 1958    W. N. ALEXANDER    2,821,534
LIQUID PHASE OXIDATION OF ORGANIC COMPOUNDS
Filed Sept. 16, 1954    5 Sheets-Sheet 3
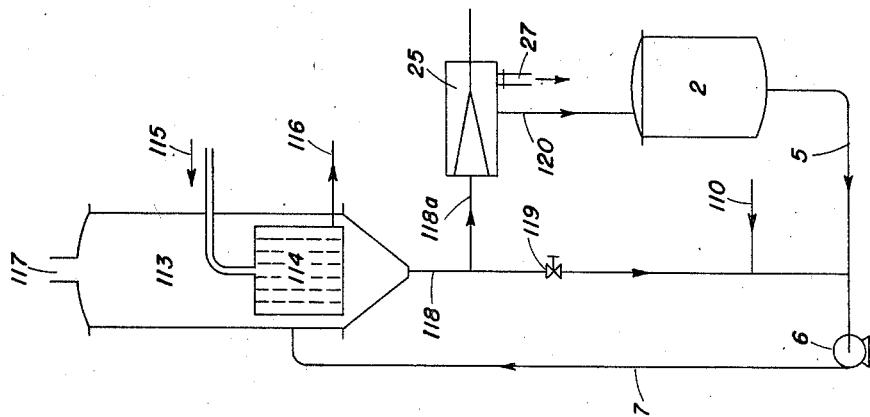
Fig. 7.
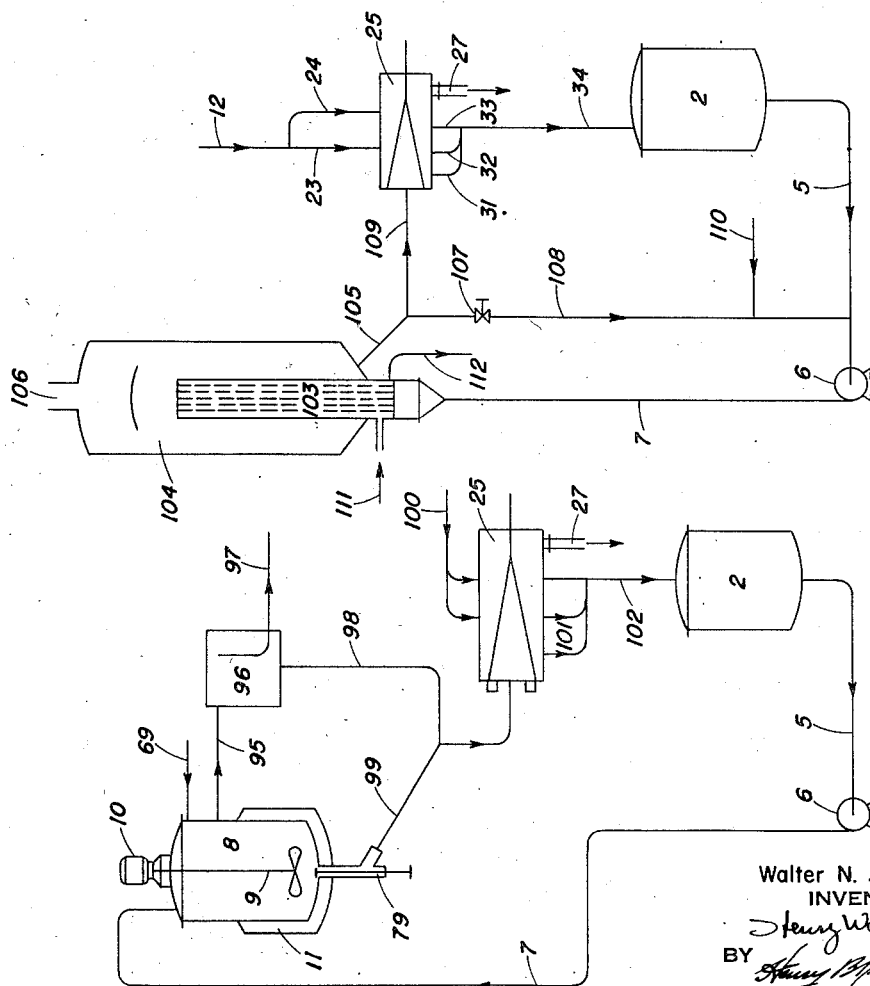
Fig. 6.
Fig. 5.
Walter N. Alexander
INVENTOR
BY
ATTORNEYS Jan. 28, 1958  W. N. ALEXANDER  2,821,534
LIQUID PHASE OXIDATION OF ORGANIC COMPOUNDS
Filed Sept. 16, 1954  5 Sheets-Sheet 5

Walter N. Alexander
INVENTOR

BY
ATTORNEYS

United States Patent Office 2,821,534
Patented Jan. 28, 1958

2,821,534

LIQUID PHASE OXIDATION OF ORGANIC COMPOUNDS

Walter N. Alexander, Verona, N. J., assignor to General Aniline & Film Corporation, New York, N. Y., a corporation of Delaware Application September 16, 1954, Serial No. 456,418

4 Claims. (Cl. 260—385)

This invention relates to the liquid phase oxidation of organic compounds and particular to the continuous manufacture of anthraquinone from anthracene.

Organic liquid phase reactions are generally of the batch type and in most cases are carried out almost to completion so as to consume the reacting substance and the oxidizing agent. Oxidizing agents such as nitric acid, sulfuric acid, potassium dichromate, potassium permanganate, hydrogen peroxide, per acids, sodium hypochlorite, etc., release oxygen which combines with the reacting substance forming the desired oxidized substance.

The oxygen supplied by the oxidizing agent often combines with hydrogen in the organic substance splitting off water as a reaction product. The formation of water resulting in a reduction in concentration of the oxidation agent beyond that caused by the normal consumption of the oxidizing agent. The dilution or weakening of the oxidizing agent results in a lowered reaction rate. Dehydrating agents often are added to the reaction zone to absorb the water of reaction, but these agents must be added in large quantities to maintain desirable reaction rates.

In many cases, the weakening of the oxidizing agent by loss of oxygen through breakdown alone is sufficient to cause a lowering of the reaction rate and larger quantities of oxidizing agent are required to maintain the desirable rates. If higher strength oxidizing agents are used, care must be exercised since undesirable side reactions may result or the oxidation may proceed beyond the desired limits.

An effective method of utilizing waste liquors containing oxidizing agents is described in U. S. Patent No. 1,405,954 issued to Charles J. Thatcher on February 7, 1922. According to the teachings of this patent, waste chromic acid oxidizing solution is regenerated to full strength to be reused in the reacting mechanism without further dilution. This is a step-wise regeneration where first high strength oxidizing agent is reduced to a lowered strength and then brought up to full strength by regeneration, etc. However, in that patent the strength of the oxidizing agent is continuously being lowered drastically during the course of the reaction.

In most cases the reacting organic substance is entirely consumed during the course of the reaction. If the consumption is incomplete it is because of the desire to restrict the formation of unwanted by-products or to limit the extent of oxidation. The consumption of the reacting organic substance lowers the reaction rate in a manner similar to the consumption of the oxidizing agent. The combination of decreasing strength in both the reacting organic substance and oxidizing agent rapidly decreases the reaction rate and indeed, in many cases, increase the time requirements for the reaction to such a degree that excessively large equipment is required to reach a desired commercial production rate.

Continuous reactors, not having recirculation, do not circumvent the difficulties described under the batch type reactors.

I have found that it is possible to markedly increase the rate of reaction in oxidizing organic substances without producing substantial undesirable by-products.

I have also found that I can markedly reduce the loss of oxidizing agent and reacting organic substance and maintain high yields of desired oxidized products.

Accordingly, it is the object of the present invention to provide a continuous method of oxidizing organic substances.

Another object is to provide a continuous method of oxidizing long chain organic monocarboxylic fatty acids into short chain fatty acid monocarboxylic acids and dibasic acids.

A further object is to provide a continuous method of manufacturing anthraquinone by the oxidation of anthracene.

Other objects and advantages will become manifest from the following disclosure.

The process consists of liquid phase oxidation whereby an organic substance and oxidizing agent are continuously fed to a reaction zone, where these components at optimum strength and essentially of constant composition react, to form the desired organic substance. The oxidized substance is continuously withdrawn from the reaction zone along with unreacted organic substance and unreacted oxidizing agent. The oxidized organic substance is separated from the unreacted organic substance and unreacted oxidizing agent and withdrawn from the system. The unreacted organic substance and unreacted oxidizing agent are fortified with additional quantities of organic substance and oxidizing agent and continuously returned to the reaction zone in optimum concentration.

The process of the present invention, when applied to the manufacture of anthraquinone from anthracene, consists of continuously feeding a solution or slurry of anthracene to a reaction zone where the anthracene reacts with nitric acid in optimum concentration to produce anthraquinone. In the case of solution wherein a conventional solvent, as hereinafter described, is employed the solvent is saturated with respect to anthraquinone at the temperature of the reaction. Continued reaction of anthracene causes anthraquinone to crystallize or precipitate out from the solvent. In the case of a slurry wherein an inert-liquid medium is employed as a carrier for the anthracene, the liquid medium contains an amount of anthracene sufficient to form a fluid slurry capable of being transported through the pipe lines to the reduction zone. Anthraquinone is continuously removed from the reaction zone as a suspension or slurry with the inert liquid medium or solvent mixture. The anthraquinone is continuously separated from the inert liquid medium or solvent, washed free of adhering impurities and removed from the system in high yields. The inert liquid medium or solvent containing unreacted anthracene is fortified with additional anthracene and this slurry or solution is returned to the reaction zone as will be described hereinafter. It is to be noted that instead of employing an inert liquid medium, as will be described hereinafter, a mixture of such liquid medium and solvent may be employed. The proportion of solvent may vary from 50 to 10 parts by weight of solvent to 90 to 50 parts by weight of liquid medium. The concentration of the solid anthracene in such inert liquid medium or mixture of liquid medium and solvent may vary from 1 to 30 parts by weight.

The foregoing objects and advantages will appear more fully in the following detailed description of a preferred embodiment of the invention and with reference to drawings in which:

Fig. 1 is a flow sheet for the continuous manufacture of anthraquinone by the oxidation of anthracene.

Fig. 5 shows a flow sheet for the preparation of the reaction mixture and of the addition of fresh oxidizing agent to the reaction kettle 8 of Fig. 1.

Fig. 6 shows a flow sheet of a forced circulation type of evaporator in place of the reaction kettle 8 of Fig. 1.

Fig. 7 shows a flow sheet of a basket type vertical tube evaporator in place of the reaction kettle 8 of Fig. 1.

Figure 4:
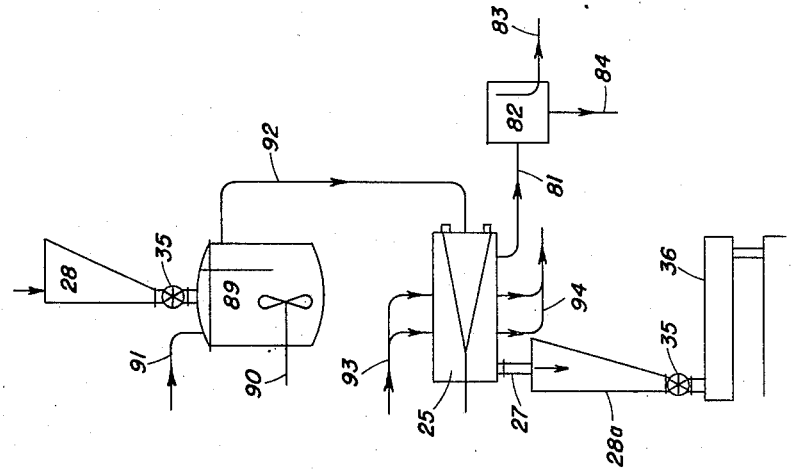
Fig. 4 shows a flow sheet variation of the feeding of the liquid-diluent wet cake from the hopper 28 through the vapor tight feeder 35 of Fig. 1.

All the parts given are by weight unless otherwise noted.

Referring to the drawings, and in particular to Fig. 1, 100 parts of crude anthracene per hour, containing 92 parts anthracene, is continuously fed through feed line 1 into kettle 2 wherein the crude anthracene may be dissolved in a liquid hydrocarbon or a halogenated hydrocarbon solvent-diluent. For this purpose I prefer a liquid halogenated hydrocarbon since practically all such hydrocarbons are solvents for anthracene. As examples of such solvents, chloroform, carbon tetrachloride, dichlorobenzene, trichlorobenzene, and the like, may be employed. I may also employ nitrobenzene, glacial acetic acid, toluene, etc. It is to be noted that the nature or character of the solvent-diluent is immaterial so long as it is a solvent for the anthracene. For purposes of practical expediency, I prefer using trichlorobenzene.

It is to be further noted that any one of the liquid hydrocarbons, halogenated hydrocarbons, such as dichlorobenzene, trichlorobenzene, or mixtures thereof, including water, aqueous caustic soda, pyridine, etc., may be utilized as a washing medium for the removal of the impurities from the separated anthraquinone. The solution of the anthracene in trichlorobenzene is best effectuated at a temperature of 85° C.–110° C. so as to obtain a solution slightly below the saturation point. At the beginning of the continuous process, the contents in kettle 2 may be heated by steam coils, not shown, at a temperature between 85° C.–110° C. To expedite solution, the liquid-diluent-anthracene mixture is mixed by agitator 3 which is propelled by motor 4. The saturated solution is metered through feed line 5 and pumped by means of pump 6 at a rate of 1000 parts per hour to feed line 7 where it enters the reaction kettle 8.

300 parts of nitric acid of approximately 3–80%, preferably 35% concentration (approximately one-third of the volume of the trichlorobenzene anthracene liquid mixture), is fed from reservoir 58 through feed line 69 into the reaction kettle 8. The volume of liquid-diluent containing the anthracene is approximately in the range of from 2 to 10 times the volume of the nitric acid solution. The nitric acid concentration selected is a controlling variable for the rate and extent of oxidation and is limited on the high side only by the desire to minimize side reactions and formation of undesirable by-products other than anthraquinone, to minimize reaction with other components present in the system. The nitric acid strength is limited on the low side only by the economic desire to maintain maximum production consistent with the factors previously mentioned. The nitric acid reacts with the anthracene either by mixing of the several components physically or by solution of nitric acid from the nitric acid-water layer into the trichlorobenzene layer or by both of these procedures simultaneously.

The nitric acid and the saturated solution of anthracene are brought into intimate contact with each other by means of agitator 9 driven by motor 10. The reaction of nitric acid and anthracene proceeds with vigor and evolution of heat. The reaction mass is maintained at a temperature ranging between 85° C.–115° C., preferably at about 105° C.–110° C. and at atmospheric pressure; external heat being supplied, if necessary, by the use of steam furnished to jacket 11. The components present in the reaction kettle 8 form a constant boiling mixture consisting of unreacted anthracene, aqueous nitric acid, nitrogen oxides and anthraquinone dissolved in trichlorobenzene and crystallized or precipitated anthraquinone. The temperature of the constant boiling mixture determines the reaction temperature and in large measure is dependent on the liquid-diluent employed, the strength of the nitric acid solution and the total pressure on the reaction system.

The volatile products of the boiling mixture are removed through line 13 and are partially condensed in cooler 14. The non-condensed gases consisting essentially of nitrogen oxides and some entrained liquid are conducted through line 18 into entrainment separator 19. The condensed liquid discharge from cooler 14 flows through line 15 into the liquid-gravity separator 16. The entrained liquid separated in entrainment separator 19 is conducted through line 20 into the liquid gravity separator 16.

The reaction between nitric acid and anthracene forms anthraquinone. The liquid-diluent saturated with anthraquinone precipitates or crystallizes out anthraquinone on continued reaction to form a slurry with the reaction mixture. The slurry of anthraquinone, containing unreacted anthracene and nitric acid, etc., is discharged through overflow line 12 into a continuous washing type filter or liquid-solid centrifuge 25 driven by motor 26. In the filter or centrifuge, the anthraquinone is separated as a solid cake, wet with liquid-diluent-mixture and adhering nitric acid solution. The cake received one or more washings of relatively pure trichlorobenzene or other liquid-diluent, which is effective in substantially removing the impurities from the separated anthraquinone. The supply of the trichlorobenzene used for washing purposes may be obtained from liquid gravity separator 16, through control valve 21 into line 22, where it is diverted into stream 23 and stream 24 entering the liquid-solid centrifuge 25 or filter. The quantity of trichlorobenzene required for washing purposes is equal to approximately 5 parts per 1 part of the dry anthraquinone cake produced and is used in the range of from 3 to 10 parts or more of the dry anthraquinone cake produced. The nitric acid adhering to the wet cake may be removed by washing with water until the filtrate is substantially neutral. The mother liquid-diluent-mixture contains unreacted anthracene in solution, nitric acid solution, dissolved anthraquinone and possibly some anthraquinone solid as fine crystals. The mother liquid-diluent-mixture is thereafter discharged through line 31, where this stream combines with the washings discharged through lines 32 and 33 into line 34 and this combined stream flows into kettle 2.

In kettle 2, the liquid-diluent-mixture dissolves additional anthracene by means of agitator 3 driven by motor 4. The new liquid-diluent-mixture flows through line 5 to pump 6 and the operation is continued.

From filter or centrifuge 25, the anthraquinone cake, wet with adhering liquid-diluent and water is discharged through line 27 into hopper 28. By means of a rotary valve 35 adequately sealed against vacuum or gas pressure, the wet anthraquinone is continuously fed to desolventizer or continuous drier 36. The continuous desolventizer is operated under vacuum in order to completely remove the solvent and water and for improved heat transfer conditions. The vapors consisting of substantially pure liquid-diluent, with small quantities of water are conducted through line 43 into vapor condenser 44 and thereafter into receiver 45. Receiver 45 is the storage reservoir for recovered liquid-diluent. The system is maintained under vacuum by exhausting the non-condensed gases through a steam jet 46. Steam enters through line 47 and exhaust gases are delivered to waste through line 48.

The liquid-diluent free anthraquinone cake is discharged through line 37 into conveyor 38 which discharges into hopper 39. The vacuum is broken by vent valve 42 and the anthraquinone cake is discharged through gate valve 40 to anthraquinone storage or further processing 41. From 100 to 106 parts of anthraquinone of high purity are produced per hour, which corresponds to a yield of 93 to 98.5% of theory.

The recovered liquid-diluent is discharged from receiver 45 through line 49 to pump 50 and thereafter to line 51 where it enters line 22 as a wash liquid. Liquid-diluent make-up enters storage 52 and can be used as a washing liquid if desired.

The vapors leaving the top of entrainment separator 19, consisting essentially of nitrogen oxides, are conducted through line 53 to a packed tower 56 used for manufacturing nitric acid. A controlled quantity of air as practiced by the well known arts is admitted through line 55 by air control damper 54 to main line 53. The air oxidizes the nitrogen oxide gases to nitrogen dioxide and the gases entering the bottom of tower 56 are essentially nitrogen dioxide and excess air.

Dilute nitric acid leaving separator 16 through line 17 passes through control valve 57 to nitric acid head tank 58. Make-up water if required is added to the nitric acid head tank 58 through line 59. If any water build-up should occur, dilute nitric acid may be removed through line 77 by means of control valve 78, thus maintaining the total water in the system constant. The dilute nitric acid of 20–40% concentration enters the nitric acid tower through line 60 and in passing down through packed tower 56 the water reacts with nitrogen dioxide to form nitric acid. The absorbed and concentrated nitric acid is discharged from packed tower 56 through line 61 to cooler 63. Make-up nitric acid can be added at this point and in order to remove heat of dilution it is added ahead of cooler 63 through feed line 62. The discharge from cooler 63 going through line 64 feeds pump 6a which discharges to line 65 and thereafter through control valve 66 to reaction kettle 8. Part of the stream can be diverted through control valve 67 into head tank 58. By-pass valve 68 regulates the nitric acid strength desired in the reactor by combining dilute and concentrated acids.

The exhaust gases from the nitric acid tower are conducted to water jet exhauster 71 by means of line 70. Water enters at line 72 and discharges as waste through line 73.

Since reaction conditions are favorable throughout many parts of the system, adequate vent lines for removal of gaseous products are provided for as shown by vents 74, 75 and 76.

If any impurities or by-products build up in the liquid-diluent-mixture, interruption of the continuous system may be necessary and valve 79 can be used to discharge the kettle contents after the processing operations are carried out as will be described hereinafter.

The reaction may be initiated by first dissolving anthracene in trichlorbenzene in kettle 2, so that the anthracene trichlorbenzene solution contains approximately 10% of anthracene. The solution is prepared by means of the agitator 3 driven by motor 4 and by steam passing through a steam coil (not shown). The anthracene feed mixture is discharged through line 7 by means of pump 6 to the empty reactor kettle 8 at a rate of approximately 1000 parts per hour. At the same time, nitric acid of approximately 35% strength is introduced through feed line 69 from reservoir 58 at a rate of approximately 300 parts per hour. The agitator 9 driven by motor 10 is started and the reaction takes place with the formation of anthraquinone. Heat is supplied by steam passing through jacket 11. As the reaction continues, anthraquinone drops out of solution, and by the time the level of the liquid-diluent-mixture reaches the overflow level a slurry of anthraquinone crystals in the liquid-diluent-mixture is formed. This slurry overflows through line 12 and is fed to the filter or centrifuge 25, which is now started. Trichlorbenzene supplied from storage tank 52 is used to wash the anthraquinone crystals in filter or centrifuge 25. As the reaction proceeds adequate quantities of trichlorbenzene may be obtained for washing purposes from the liquid-gravity separator 16. Water can be then used for washing out the residual nitric acid in the cake, and the cake is then delivered to the dryer-desolventizer 36. The nitrogen oxide vapors generated in kettle 8 are vented through line 13, condenser 14 and lines 18 and 53 to tower 56 after having been oxidized with air supplied through line 55 by air damper 54. The nitrogen oxide reacts with water forming nitric acid and this acid can now be circulated back to reactor kettle 8 as required.

Figure 3:
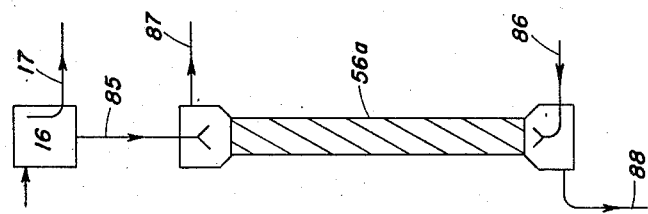
Fig. 3 shows a flow sheet variation of the treatment of the liquid-diluent which is boiled off from the reaction mixture and which is to be used as a wash in the centrifuge 25 of Fig. 1.
Figure 2:
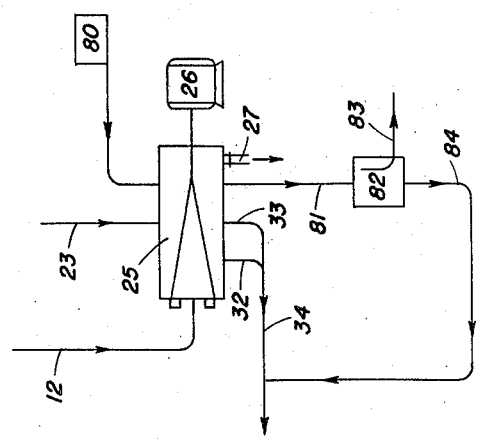
Fig. 2 shows a flow sheet variation, of the wash in the continuous washing type liquid-solid centrifuge 25 of Fig. 1.

In order to remove the nitric acid or other impurities from the anthraquinone, a variation in the washing of the cake in the liquid-solid centrifuge or filter 25 may be resorted to. This variation is shown in Fig. 2 and involves the use of a wash such as dilute caustic soda of 1 to 10% concentration or a solvent such as pyridine in lieu of a second liquid-diluent wash of the anthraquinone wet cake. In this variation, the overflow line 12 brings the reaction mixture from the reaction kettle 8 to the centrifuge or filter 25. Fresh solvent such as trichlorbenzene, and the like, enters the centrifuge through line 23 as a first wash and leaves through line 32 joining the mother liquor leaving the centrifuge line 33 and is returned through line 34 to kettle 2. A second wash such as dilute caustic soda, pyridine and the like, enters the centrifuge from storage 80 and is discharged through line 81 or further processing through separator 82 and line 83. Any liquid-diluent which is separated from the wash with caustic is discharged through line 84 and recycled to line 34, feeding to kettle 2. The mixture of trichlorbenzene and pyridine can be separated by fractional distillation and returned to the process as relatively pure components. The wet anthraquinone is discharged through line 27 to the hopper 28 shown in Fig. 1.

Where the quantity of nitric acid retained by the liquid-diluent is undesirable for further processing, determined by the purity of anthraquinone desired after the washing operations, the treatment of the liquid-diluent which is boiled off from the reaction mixture and which is to be used as a wash in the filter or centrifuge 25 may be varied as shown in Fig. 3. The condensed liquid-diluent and dilute nitric acid solution are separated in separator 16. The dilute nitric acid is discharged through line 17 and the liquid-diluent passes through line 85 to a separate tower 56a where it passes countercurrent to and is washed by water or a dilute caustic soda solution which enters the bottom of the tower through line 86. The wash liquid leaves the top of the tower through line 87 which goes to waste or to further processing operations and the washed liquid-diluent leaves the bottom of the tower through line 88 which is connected to line 22 of Fig. 1. The liquid-diluent free from nitric acid then proceeds through the filter or centrifuge 25.

In the case where the residual nitric acid in the filtered or centrifuged anthraquinone is greater than desirable and in order to increase the purity and to avoid any hazards of nitrates in subsequent processing operation, the nitric acid may be washed or neutralized by the expedient shown in Fig. 4. The processing step involves feeding the liquid-diluent wet cake from the hopper 28 through the vapor tight feeder 35 into the baffled kettle 89 where it is mixed by agitator 90 with either water or dilute caustic soda solution entering through feed line 91. The kettle 89, is baffled to insure thorough mixing for washing or neutralization before the slurry is fed through line 92 to the centrifuge 25. The mother liquor is discharged through line 81 into separator 82 and the separated spent caustic or other wash liquor is discharged through line 83. Any entrained liquid-diluent is discharged through line 84 and recycled to line 34 of Fig. 1.

The cake is washed in the filter or centrifuge 25 with water entering lines 93 and the filtrate discharged to waste through lines 94. The anthraquinone paste which contains solvent-diluent and some water is discharged through line 27 into the hopper for further processing.

In a modification of the process steps shown in the flow sheet of Fig. 1, the reaction may be carried out with a substantially two phase system in the reaction kettle with the agitator supplying a gentle nonturbulent mixing. With the two phases in the reaction kettle the nitric acid layer is withdrawn from the kettle for refortification while the liquid-diluent phase containing anthraquinone is withdrawn through a bottom outlet valve.

This modification is shown in Fig. 5 wherein the reaction mixture is prepared in dissolving kettle 2 and discharged through line 5 to pump 6 and is pumped through line 7 to the reaction kettle 8. Dilute nitric acid is withdrawn from the reaction kettle 8 through line 95 to a separator 96. The acid is separated from any entrained liquid-diluent and is discharged through line 97 to the acid recovery unit 56 as shown in Fig. 1. Any liquid-diluent is discharged through line 98 and is recycled to the system through filter or centrifuge 25 and then through line 102 into kettle 2. The anthraquinone crystals containing liquid-diluent-mixture from the reaction kettle 8 is discharged through line 99 to the centrifuge 25. The anthraquinone crystals are separated from the mother liquor, washed by liquid-diluent entering through line 100 and discharged through line 27 into the hopper wherein the anthraquinone is further processed as shown in Fig. 1. The liquid-diluent wash is discharged from the centrifuge through line 101 to line 102 to kettle 2.

As an alternative in conducting the oxidation reaction the employment of an evaporator type reaction kettle may be resorted to instead of the kettle 8 (of Fig. 1) as shown in Fig. 6. The forced circulation type evaporator provides agitation for the reaction mixture either by forced circulation or natural convection depending upon the type of evaporator chosen, as well as providing for the removal of liquid-diluent and water formed during the reaction. The liquid diluent which is evaporated from the reaction mixture is condensed and used in the filter or centrifuge 25 as a wash for the anthraquinone cake.

The reaction mass is prepared in dissolving kettle 2 and withdrawn through line 5 to pump 6 and delivered through line 7 to the tubes of the heating unit 103 of evaporator 104. The reaction mass flows through the the heating unit—which is maintained at a temperature ranging between 85° C.–115° C., by means of steam entering line 111 and leaving through line 112, and is partially evaporated, the liquid mixture containing the anthraquinone crystals is drawn off through line 105 while the vapors are drawn off through vent 106 at the top of the evaporator and delivered through line 13 as shown in Fig. 1, to nitric acid recovery tower 56. The reaction mixture which leaves through line 105 is split and part of it recycled to the reactor through control valve 107 into line 108 through line 5 to pump 6 and then through line 7 to reactor 104. The other part is fed to centrifuge 25 by means of line 109. Nitric acid can be introduced through line 110 which is circulated into feed line 7 from recovery unit 56 at the desired rate. In the filter or centrifuge 25, the crystallized anthraquinone is separated from the mother liquor, washed and discharged through line 27 and further processed as in Fig. 1. The mother liquor is discharged from the centrifuge through line 33 and the wash liquors are discharged through lines 31 and 32 to the dissolving kettle 2 where it is refortified and returned to reactor 104 where it joins with the portion that has by-passed the centrifuge 25.

Fig. 7 shows a basket type vertical tube evaporator as the reaction kettle. The reaction mass is prepared in dissolving kettle 2 and pumped through lines 5 and 7 by means of pump 6 to the reactor kettle 113 where it circulates through the tubes of the heating unit 114 and flows down and around the outside of the heating unit. Heat is supplied to the heating unit by means of steam entering line 115 and the condensate discharged through line 116. Crystals of anthraquinone are formed as the reaction takes place and at the same time, solvent-diluent and the water formed by the reaction are evaporated and leave the reactor through discharge line 117 through line 13 to condenser 14 as shown in Fig. 1. A portion of the reaction mass is continuously withdrawn from the reactor kettle 113 through the bottom outlet into line 118. Valve 119 is provided on line 118 as a by-pass in the event that more forced circulation of the reaction mass through centrifuge 25 is desirable. Nitric acid is added through line 110 for circulation through lines 5 and 7 to reactor 113. The reaction mixture from line 118 is fed to the centrifuge 25 through lines 118 and 118a and anthraquinone crystals are separated from the mother liquor, washed and discharged through line 27 and processed as described above. The mother liquor is discharged through line 120 into the dissolving keettle 2 where it is refortified for recirculation to the reaction unit.

The liquid-diluent is chosen for its non-reactivity under the conditions of the reaction, its ability to increase the reaction rate as a medium of the reaction without change of chemical composition, its relatively higher solubility for anthracene as compared to anthraquinone at the temperature of the reaction, its partial or total solubility for nitric acid at the temperature of the reaction or its ability to decrease the interfacial tension between the diluent mixture phase and the nitric acid solution phase without forming undesirable emulsions, its boiling point for ease in removal of the liquid-diluent as a constituent of the boiling mixture or in further recovery during subsequent separation operations.

The total pressure on the system, particularly the reaction zone, is preferred to be at atmospheric for general ease of operation and simplicity of equipment. However, higher or lower pressures may be used depending on the choice of liquid-diluent.

The nitric acid in the reaction zone may be fortified by removing the water in the reaction zone by applying heat in addition to the heat of reaction, taking off dilute nitric acid vapors and liquid diluent and nitrogen oxides in the vapor phase and adding back to the reactor zone concentrated nitric acid manufactured in the nitric acid tower from nitrogen oxides, air and dilute nitric acid.

The nitric acid in the reaction zone may be fortified to optimum strength by removing the dilute nitric acid from the upper phase of a substantially non-turbulent two phase system of nitric acid solution and the preferred diluent-trichlorbenzene, separating the trichlorbenzene, and delivering the dilute nitric acid, nitrogen oxides and air to the nitric acid tower to produce a more concentrated nitric acid, which acid is returned to the reaction zone to produce optimum strength nitric acid in the reaction zone.

The nitric acid in the reaction zone may be fortified by separating the dilute nitric acid from the liquid-diluent-mixture discharged from the centrifuge and returning the dilute acid to the nitric acid tower as described.

The manufacture of concentrated nitric acid from dilute nitric acid, air and nitrogen oxides can be accomplished by any of the well-known means. Such a system can be operated at superatmospheric pressures in order to reduce the size of the equipment if desired by interposing a compressor between the air admittance line and the nitric acid manufacturing unit.

The optimum strength of anthracene in the liquid-diluent-mixture in the reaction zone is dependent on the maximum concentration of anthracene in the reaction mixture that will produce a fluid system and is also dependent on the economic considerations involving quantity of liquid-diluent and equipment size necessary to wash out the adhering anthracene from the produced anthraquinone in the separation equipment. It is preferred to operate in the range of maximum solubility of anthracene in the liquid-diluent-mixture at the temperature of reaction. At the temperature of the reaction, the preferred strength is approximately one part of anthracene to ten parts of liquid-diluent as trichlorbenzene. The anthraquinone crystals produced in the reaction zone form a suspension or slurry with the liquid-diluent-mixture which is withdrawn from the reaction zone and is preferably separated from the liquid-diluent-mixture at the reaction temperature.

Anthracene may be used in this process with a wide degree of latitude with respect to impurities which may be (a) soluble or (b) insoluble at the reaction temperature.

In those cases where the impurity or its reaction and products are moderately or very soluble at the reaction temperature it can be expected that their build-up in concentration caused by recycling of the liquid-diluent will eventually result in their appearance along with the product anthraquinone crystals. When these impurities reach an amount which causes the anthraquinone to be objectionable, the anthracene feed can be stopped and the reactant mass cooled to precipitate or crystallize a mixture of both dissolved anthraquinone and impurities which may be separated from the liquid-diluent for further processing if desired. The liquid-diluent is immediately available for continuation of the process as described.

Another means for removing the soluble impurities can be effected by first stopping the anthracene feed, consuming the anthracene in the liquid-diluent-mixture until an economic quantity of anthracene is converted to anthraquinone, separating the anthraquinone as previously described and then steam distilling the liquid-diluent so that a pumpable liquid, containing impurities and/or by-products may be removed from the reaction zone. The impurities or by-products may be further processed if desired. The liquid-diluent is available for continuation of the process as described.

In those cases where the impurities or their reaction end products are slightly soluble or insoluble at the reaction temperature, it can be expected that their presence in the end product will occur immediately or at least very soon after the start of separation of anthraquinone from the liquid-diluent. In this case the tolerance for these impurities by the anthraquinone produced limits the degree of impurity desirable in the anthracene starting material. The presence of such an impurity does not necessarily prevent manufacture under these conditions since the resulting anthraquinone can generally be purified to an acceptable condition by well-known methods such as sublimation, selective solvent extraction, solvent crystallization, etc. It is desirable to conduct this manufacture in such a fashion that the anthraquinone produced is directly applicable for use in manufacture without further purification.

Many well-known means can be used for separating the solids discharged from the reaction zone. The preferred means is a continuous liquid-solid centrifuge of the Bird type or equal or a continuous filter press, both capable of carrying out washing operations on the separated cake. Other means include continuous pressure filtration, batch centrifuging, bath pressure filters of the enclosed type, Nutsche type filters, and other means of separating solids from liquids.

Although newly formed anthraquinone crystals can be separated from the liquid-diluent-mixture in selected liquid-solid separating equipment, it may be desirable to grow these crystals to a larger size in order to improve the separation operation. In such case, the reaction zone may be increased in volume so that the holding time is lengthened and thus allow additional crystal growth. The optimum holding time devoted to crystal growth is dependent on the efficient and economic separation of the anthraquinone solids from the liquid-diluent slurry.

Several means may be employed to keep the volume of trichlorobenzene in this system constant. One of the methods is to add heat to the reaction zone in addition to the heat of reaction. The input of heat results in the formation of a constant boiling mixture of nitric acid, water, trichlorobenzene and nitrogen oxides. A constant concentration of nitric acid in the reaction zone can be provided by the removal of water as dilute nitric acid in the vapor and the return of concentrated acid to the reaction zone. The removal of water vapor would therefore carry along proportionate quantities of trichlorobenzene and the other components of the boiling mixture. The condensed trichlorobenzene after separation from the dilute nitric acid can be then used as the washing medium. If this supply is insufficient, additional trichlorobenzene can be vaporized from the reaction zone by added heat.

The trichlorobenzene used for washing the anthraquinone cake can be separately diverted and recovered by providing a still for separating any dissolved anthracene from the trichlorobenzene. A fractionating column will accomplish this purpose.

Any of the well-known means of continuously removing the liquid-diluent or water from the anthraquinone wet cake can be applied to obtain anthraquinone in the dry or solvent free state, such as, for example, continuous jacketed screw conveyors, spray drying, tunnel driers, drum driers, etc. Batch operations can include vacuum pan, air driers, etc.

Figure 9:
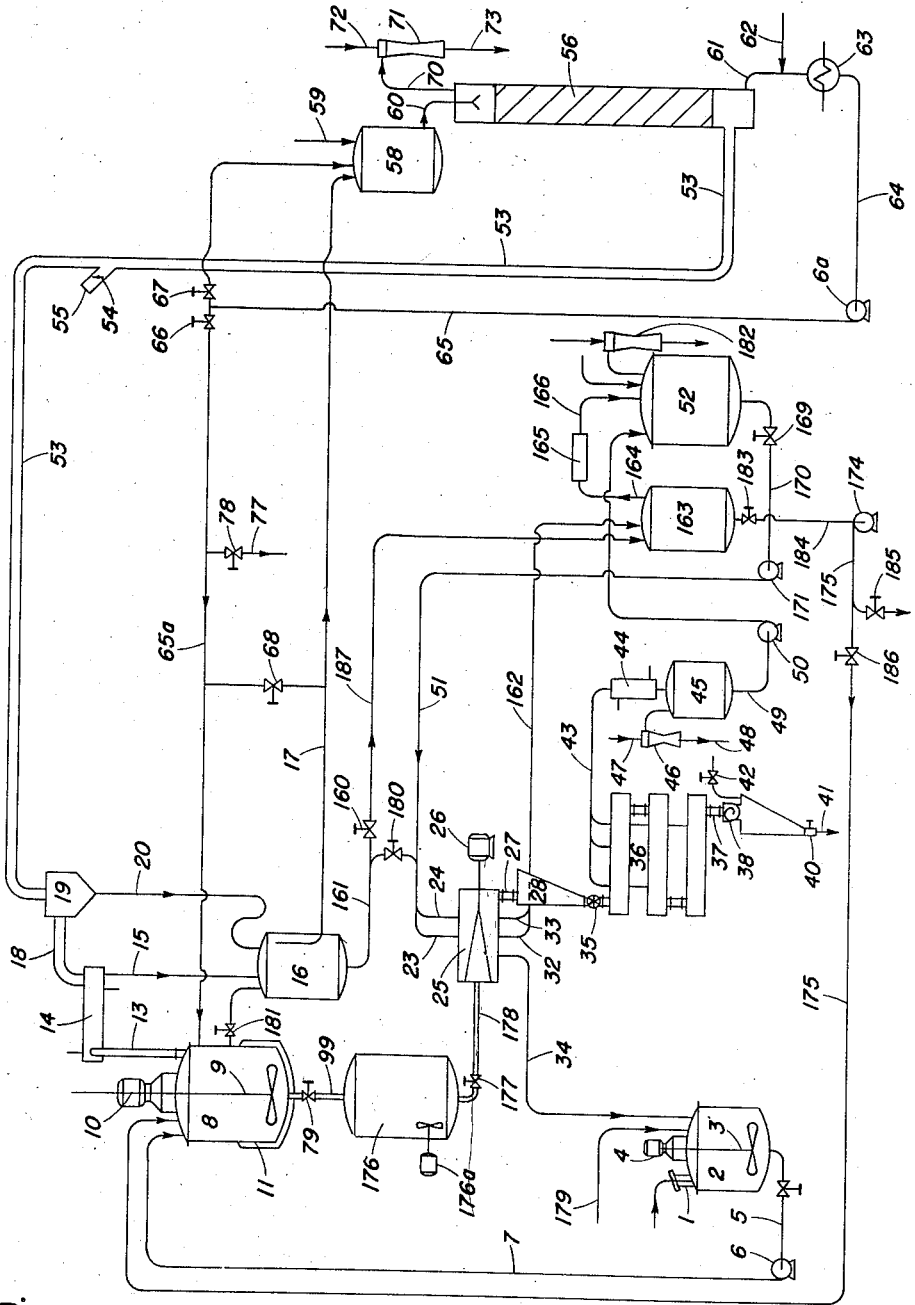
Fig. 9 shows a flow sheet for the batch modification of the continuous manufacture of anthraquinone by the oxidation of anthracene.

Referring to Fig. 9, which is a batch process and a modification of the continuous process of Fig. 1, anthracene is fed batchwise through a man-hole 1 into kettle 2, wherein the anthracene partially dissolves in trichlorobenzene (in a batch operation the anthracene content of the mixture can advantageously be made as high as of from 15–20% of the fluid mixture). The fluid mixture is charged to the reaction zone by means of pump 6 through line 7 into reaction kettle 8. Nitric acid of approximately 15 to 50% strength is fed to kettle 8 through line 65a and liquid diluent mixture (anthracene in trichlorobenzene) and nitric acid are brought into intimate contact with each other by means of agitator 9 driven by motor 10. The reaction proceeds at a temperature range of 85° C.–115° C. preferably at about 105° C.–110° C. and at atmospheric pressure, external heat being supplied, if necessary, by use of steam coils. The components present in reaction kettle 8 form a constant boiling mixture consisting of unreacted anthracene or meso anthracene compound, aqueous nitric acid and anthraquinone dissolved in trichlorobenzene and crystallized or precipitated anthraquinone.

The volatile products of the boiling mixture are removed through line 13 and are partially condensed in cooler 14. The non-condensed gases consisting essentially of nitrogen oxides and some entrained liquid are conducted through line 18 into entrainment separator 19. The condensed liquid discharges from cooler 14, flows through line 15 into liquid gravity separator 16. The liquid separated in entrainment separator 19 is conducted through line 20 into liquid gravity separator 16.

As the reaction between nitric acid and anthracene proceeds to form anthraquinone, the liquid diluent becomes saturated with anthraquinone, and thereafter anthraquinone separates or crystallizes out of the reaction mixture and is suspended in the liquid diluent as a slurry. The reaction is continued until approximately 50% of the anthracene is consumed to produce anthraquinone. Under the conditions described above, the reaction can be completed in approximately an hour or so, if this time is taken from the point where the nitric acid feed is started and the reacting components have reached the reaction temperature. Higher conversions of anthracene to anthraquinone can be effected but beyond approximately 90% conversion of anthracene to anthraquinone, the reaction rate is reduced drastically. It is preferred to operate in the range of 3-7% anthracene or meso anthracene content in the trichlorobenzene medium. One of the limiting conditions of too rapid a reaction rate is satisfactory crystal size for ease of filtration and subsequent washing. However, increasing the size of the kettle will allow longer holdup conditions and in this manner fast reaction rates and satisfactory crystal size may be achieved.

When satisfactory conversion has been achieved, the kettle contents are allowed to settle and the nitric acid at the upper layer is drained into separator 16 by opening valve 181. The residual slurry containing the suspended anthraquinone crystals is discharged into kettle 176 which is a hold-up tank for centrifuge or filter 25. The discharge of slurry from kettle 8 to kettle 176 now allows a repetition of the operations previously described. (NOTE.—The kettle contents may be drained and nitric acid layer left as a heel in the bottom of kettle 8 as an alternative to draining it through valve 181.)

The slurry residing in kettle 176 is maintained in suspension by means of agitator 176a and is discharged through valve 177 via line 178 at a controlled rate to centrifuge or filter #25, where anthraquinone is separated from the fluid mixture. The anthraquinone cake can be further washed by fresh or condensed liquid diluent obtained from kettle 16 which is discharged through line 161 and thence through by-pass valve 180 to line 51, where it is diverted into two washing lines 23 and 24. Liquid diluent for washing operations may also be obtained from a supply of purified trichlorobenzene stored in receiving tank 52. It is discharged from tank 52 through valve 169 into line 170 to pump 171 and through line 51 into streams passing through lines 23 and 24. The anthraquinone cake discharges from centrifuge 25 or filter and is delivered into hopper 28 and the anthraquinone processed as described above. The main stream of separated liquid diluent (which contains unreacted anthracene or anthracene in meso form, anthraquinone at saturation temperature and trichlorobenzene) is delivered to kettle 2 by line 34. In kettle 2 a new reaction mixture may be prepared by fortifying the mixture with additional anthracene and then pumping this mixture to the reaction kettle for a new batch treatment as previously described.

The discharge washing streams pass through lines 32 and 33 and are delivered through line 162 to still 163. In still 163 the washings are stripped of trichlorobenzene by means of vacuum jet 182 and condensed in cooler 165 and delivered through line 166 into receiver 52. The discharged impurities in still 163 may be separately processed to recover by-product values therefrom by discharging the contents through valve 183 through line 184 through pump 174 to line 175 and then discharged through valve 185, or may be returned to reaction kettle 8 by opening valve 186.

Dilute nitric acid is removed from gravity separator 16 through line 17 where it is discharged to nitric acid holding tank 58. From tank 58, it enters tower 56 through line 60 where it reacts with nitric oxide vapors entering tower 56 from line 53. A controlled quantity of air, as practiced by the well-known arts, is admitted through line 55 by air control damper 54 to main line 53. The air oxidizes the nitrogen oxide gases to nitrogen dioxide and the gases entering the bottom of tower 56 are essentially nitrogen dioxide and excess air. Make up water, if required, is added to the nitric acid head tank 58 through line 59. If any water build up should occur, dilute nitric acid may be removed through line 77 by means of control valve 78, thus maintaining the total water in the system constant. The dilute nitric acid enters the nitric acid tower through line 60 and in passing through the packed tower 56, the water reacts with nitrogen oxide to form nitric acid. The absorbed and concentrated acid is discharged from packed tower 56 through line 61 to cooler 63. Make up nitric acid can be added at this point and in order to remove heat of dilution it is added ahead of cooler 63 through feed line 62. The discharge from cooler 63 going through line 64 feeds pump 6a which discharges to line 65 and thereafter through control valve 66 to reaction kettle 8 through line 65a. Part of the stream can be diverted through control valve 67 into head tank 58. By-pass valve 68 regulates the nitric acid strength desired in the reactor by combining dilute and concentrated acids.

The exhaust gases from the nitric acid tower are conducted to water jet exhauster 71 by means of line 70. Water enters at line 72 and discharges as waste through line 73.

Valve 160 can be opened to process the residue contained in the trichlorobenzene solution in separator 16 by discharging into line 187 to still 163.

A supply of nitric acid is immediately available at kettle 8 from tank 58 at the start of a new batch and in a short time thereafter refortified acid is available by the regeneration of nitrogen oxide gases to nitric acid as previously described.

It is to be noted that the foregoing batch process can be operated at lower or higher than atmospheric pressure, such as, for example, 16-200 pounds per square inch absolute at temperatures ranging from room temperature to approximately 200° C.

It is to be further noted that at 70% concentration of nitric acid, and at either room temperature or reflux, whether employed in the continuous or batch process, a qauntitative yield of anthraquinone is obtained. At both of these temperature ranges anthracene is converted into anthraquinone as shown by U. V. spectral analysis and spectral analysis of the vatted anthraquinone.

Figure 8:
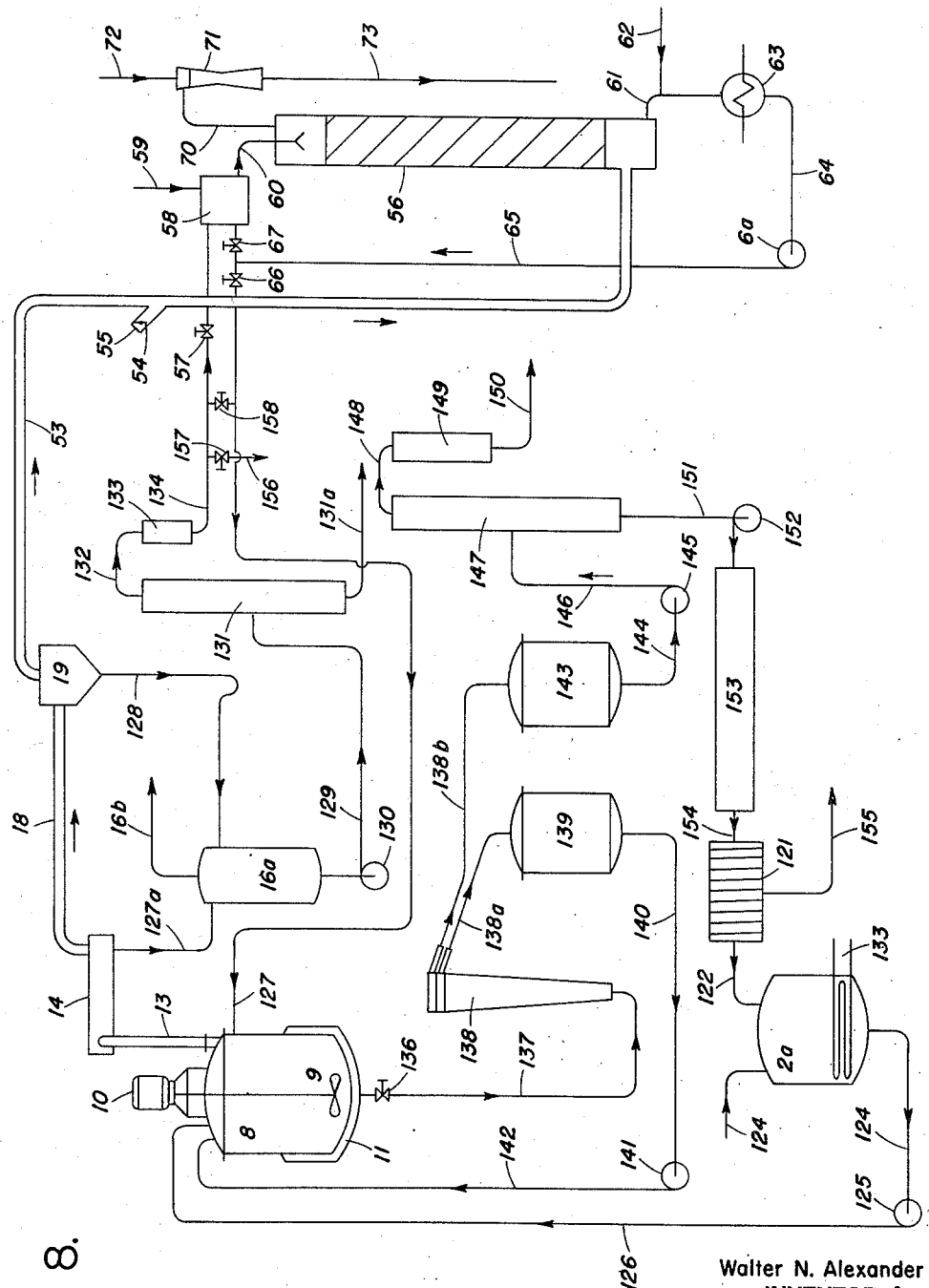
Fig. 8 shows a flow sheet for the continuous manufacture of mono- and di-basic acids by the oxidation of long chain mono-carboxylic acids.

While the foregoing procedure has been described with details of the oxidation of anthracene to anthraquinone, the same process as illustrated in the flow sheet of Fig. 8 can be applied to the continuous oxidation of long chain monocarboxylic fatty acids, such as, stearic, palmitic, oleic, and the like to form dibasic acid, such as, sebacic, azelaic, adipic, succinic, and the like, including monobasic acids, such as, lauric, caprylic, caproic, propionic, butyric, nonoic, acetic, and the like.

As an example, sebacic acid and caprylic acids may be manufactured by the continuous nitric acid oxidation of stearic acid. Stearic acid is fed through line 124 to kettle 2a, where it meets a stream of reprocessed stearic acid discharging from a hydraulic press or filter press 121 through line 122. The stearic acid mixture is fed in the molten state at approximately 100° C. (heat supplied by steam coil 133) through line 124 to pump 125, where it is delivered at the controlled rate through line 126 to kettle 8.

In kettle 8 the stearic acid mixture meets a stream of nitric acid solution discharging from line 127. The ratio of nitric acid solution to stearic acid is approximately 10 to 1 and the nitric acid strength varies from 30% to 60% or more. The two phases are intimately brought into contact with each other by means of agitator 9 driven by motor 10. Heat if necessary is supplied by steam passing through jacket 11.

The reaction of nitric acid and stearic acid is carried out at approximately 100° C.–115° C. so that a boiling mixture results and the vapors pass through line 13 to condenser cooler 14. The boiling mixture is composed in the main of nitric acid solution, evolved nitrogen oxides and lower monocarboxylic acids (that steam distill at the reaction temperature of approximately 100° C.–115° C.).

The condensate is delivered through line 127a to separation tank 16a where it meets a small stream of condensate, flowing through line 128, from entrainment separator 19. The upper layer in the separation tank consists chiefly of monobasic acids that are not soluble in water, such as, small quantities of caprylic and lower acids resulting from continued oxidation. It is important to note that the desired type of lower monobasic acid may be manufactured by control of the oxidation conditions e. g. strength of nitric acid solution, and by the rate of vapor removal from the boiling mixture. The upper layer of carboxylic acids is removed through line 16b and can be separately processed and purified.

The lower layer in separator 16a consists of dissolved carboxylic acids in dilute nitric acid solution. This mixture is discharged from separation tank 16a through line 129 by means of a pump 130 to fractionating column 131 where a dilute nitric acid solution is taken overhead through line 132. The nitric acid solution is discharged to condenser 133 and fed to nitric acid head tank 58 by means of control valve 57 where it is fed by line 60 to nitric acid concentrating tower 56. The bottoms of fractionating column 131 consists of the water soluble monobasic acids fractions and is discharged through line 131a and can be further processed and purified if desired.

A quantity of the reaction contents in kettle 8 is discharged continuously by control of regulating valve 136 to line 137 where it is fed to the continuous liquid-liquid centrifuge 138. The heavy fraction consisting in the main of nitric acid solution flows through line 138a and is delivered to storage 139 and conducted through line 140 to pump 141 and recycled through line 142 to reaction kettle 8.

The lighter fraction consisting in the main of sebacic acid, unreacted stearic acid, caprylic acids and some quantity of other dibasic and monobasic acids is discharged through line 138b to kettle 143, and then discharged at a controlled rate through line 144 to pump 145 through line 146 to fractionating column 147.

The overhead of fractionating column 147 consists of caprylic acid and other monobasic acids. The overhead vapor discharging through line 148 is condensed in condenser 149 and discharged through line 150 for further processing and purification if desired.

The bottoms of fractionating column 147 consists substantially of stearic and sebacic acids. This mixture is discharged through line 151 to pump 152 and then passed through a continuous crystallizer 153, where the sebacic acid crystallizes out of the mix. It is not necessary to completely remove the sebacic acid, consequently a high purity cut is obtainable. If desired the crystallization may be conducted in a solvent medium such as acetone, hexane, etc. not shown. The liquid stearic acid containing the crystallized sebacic acid is delivered through line 154 to a standard filter press, or hydraulic filter press 121 or other separating devices and sebacic acid is separated and discharged as solid cakes from line 155. The press liquor consisting of stearic acid and uncrystallized sebacic acid is delivered to kettle 2a through line 122. The new stearic acid feed 124 mixes with the filtered stearic acid and the process is continued as described.

The vapors from line 18 leaving the top of entrainment separator 19, consisting essentially of nitrogen oxides and are conducted through line 53 to a packed tower 56 used for manufacturing nitric acid. A controlled quantity of air as practiced by the well-known arts is admitted through line 55 by a control damper 54. The air oxidizes the nitrogen oxide gases to nitrogen dioxide, and the gases entering the bottom of tower 63 are essentially nitrogen dioxide and excess air.

Dilute nitric acid, fed through line 134 passes through control valve 57 to nitric acid head tank 58. Make-up water if required is added to the nitric acid head tank 58 through line 59. If any water build-up should occur, dilute nitric acid may be removed through line 156 by means of control valve 157. The dilute nitric acid enters the nitric acid tower through line 60 and in passing down through the packed tower 56, reacts with nitrogen dioxide to form nitric acid. The absorbed and concentrated nitric acid is discharged from packed tower 56 through line 61 to cooler 63. Make-up nitric acid can be added at this point, and in order to remove heat of dilution and is added ahead of cooler 63 through feed line 62. The discharge from cooler 63 going through line 64 feeds pump 6a which discharges to line 65 and thereafter through control valve 66 thru line 127 to kettle 8. Part of the stream can be diverted through control valve 67 into head tank 58. By-pass valve 158 can regulate the nitric acid strength desired in the reactor by combining dilute and concentrated acids.

The exhaust gases from the nitric acid tower are conducted to water jet exhauster 71 by means of line 70. Water enters at line 72 and discharges as waste through 73.

Phthalic acid may be manufactured by the nitric acid oxidation of ortho xylene by use of equipment and processing operations similar to that described in Figures 1 through 8. Ortho xylene is dissolved in a suitable solvent and fed to the reaction zone where it meets a stream of nitric acid solution of controlled strength. A boiling mixture of nitric acid solution, ortho xylene and nitrogen oxides are formed. The mixture of vapors are continuously removed and condensed. The nitrogen oxide gases along with separated dilute nitric acid is fed to the nitric acid tower, where concentrated acid is manufactured for reuse in the reaction zone. The unreacted ortho xylene in trichlorobenzene condensed from the boiling mixture vapors after separation from the dilute nitric acid is returned continuously to the reaction zone. The reaction between ortho xylene and nitric acid forms phthalic acid. The reaction mixture consisting of phthalic acid, ortho xylene, liquid diluent solvent and nitric acid solution is continuously removed from the reaction zone. The phthalic acid can be separated from the ortho xylene, liquid-diluent solvent and nitric acid solution by centrifuging or filtration after cropping out crystals or by distillation techniques. The unreacted ortho xylene in liquid-diluent solvent is returned with additional ortho xylene, to the reaction zone and the processing continued as previously described. The heating of phthalic acid to an elevated temperature results in the production of phthalic anhydride, a valuable product of commerce. An additional means of separating phthalic acid is to first separate the nitric acid solution by settling or centrifuging operations, then add sodium hydroxide to form sodium phthalate, which separates as the water phase from the liquid-diluent containing ortho xylene. The sodium phthalate may be reacidified to reform phthalic acid. It may then be heated in the conventional manner to form phthalic anhydride.

The process of the present invention is also applicable to the liquid phase oxidation of many organic compounds into valuable products and intermediates, for example: Aniline and the various homologues thereof may be oxidized by means of potassium permanganate in sulfuric acid, or by means of potassium permanganate in alkaline medium to yield a variety of chemical products.

I claim:

1. A method for the continuous manufacture of anthraquinone from anthracene which comprises feeding a continuous stream of anthracene to a reaction zone and contacting therewith a continuing stream of nitric acid of 3–80% concentration to form a fluid mixture, reacting the mixture at a temperature ranging from room temperature to 200° C. and at a pressure ranging from 1 to 215 pounds per square inch absolute to form a continuing stream of a fluid mixture containing anthraquinone and from 3% to 7% of unreacted anthracene, separating the anthraquinone from the mixture, passing the mixture separated from the anthraquinone to a zone containing anthracene simultaneously withdrawing from said reaction zone nitrogen oxide gases to form a new fluid mixture of anthracene, and returning the said new mixture to the reaction zone for renewed contact with said nitric acid of substantially the same content as the acid first used in contacting the anthracene feed, derived from said nitrogen oxide vapors, and repeating the said reaction and removal of anthraquinone in a yield of 93% to 98.5% of the theoretical yield per pass.

2. A method for the continuous manufacture of anthraquinone from anthracene which comprises feeding a continuing stream of a saturated solution of anthracene in an inert liquid solvent-diluent to a reaction zone and intimately mixing therewith a continuing stream of nitric acid of 3–80% concentration, heating the mixture at a temperature of 85° C.–115° C. to form a constant boiling mixture containing from 3% to 7% of unreacted anthracene in which the said inert solvent-diluent is saturated with anthraquinone and causes the anthraquinone to crystallize out, separating the anthraquinone crystals from the solvent-diluent, passing the solvent-diluent to a zone containing anthracene simultaneously withdrawing from said reaction zone nitrogen oxide gases to form a new saturated solution of anthracene, and returning the said saturated solution to the reaction zone for intimate mixing with said nitric acid of substantially the same content of the acid first used in contacting the anthracene feed, derived from said nitrogen oxide vapors, and repeating the said heating and removal of anthraquinone crystals in a yield of from 93% to 98.5% of the theoretical yield, per pass.

3. A method for the manufacture of anthraquinone from anthracene which comprises feeding anthracene to a reaction zone and contacting therewith nitric acid of 35% concentration to form a fluid mixture, heating the mixture at a temperature of 85° C.–115° C. to form a mixture which contains from 3% to 7% of unreacted anthracene and is saturated with anthraquinone thereby causing the anthraquinone to crystallize out and removing the anthraquinone from the mixture, passing the mixture from which the anthraquinone has been removed to a zone containing anthracene to refortify the additional mixture with anthracene and returning the refortified mixture to the reaction zone for contacting with said nitric acid, and repeating said heating and removal of anthraquinone crystals in a yield of from 93% to 98.5% of the theoretical yield, per pass.

4. The process according to claim 2 wherein the inert solvent-diluent is trichlorobenzene.

References Cited in the file of this patent

UNITED STATES PATENTS 1,103,383    Singer et al. _____ July 14, 1914

FOREIGN PATENTS 283,213    Germany _____ Apr. 6, 1915